United States Patent
Jeong et al.

(10) Patent No.: US 12,166,230 B2
(45) Date of Patent: Dec. 10, 2024

(54) SECONDARY BATTERY AND MANUFACTURING METHOD THEREFOR

(71) Applicant: Samsung SDI Co., Ltd., Yongin-si (KR)

(72) Inventors: Hyun Ki Jeong, Yongin-si (KR); Ho Jae Lee, Yongin-si (KR); Jung Hyun Park, Yongin-si (KR); June Hyoung Park, Yongin-si (KR); Sang Mi Lee, Yongin-si (KR); Won Ik Lee, Yongin-si (KR); Ye Ji Cha, Yongin-si (KR); Nobuyuki Oyagi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 237 days.

(21) Appl. No.: 16/960,293

(22) PCT Filed: Oct. 8, 2018

(86) PCT No.: PCT/KR2018/011841
§ 371 (c)(1),
(2) Date: Jul. 6, 2020

(87) PCT Pub. No.: WO2019/139220
PCT Pub. Date: Jul. 18, 2019

(65) Prior Publication Data
US 2020/0343520 A1    Oct. 29, 2020

(30) Foreign Application Priority Data
Jan. 9, 2018    (KR) ........................ 10-2018-0002868

(51) Int. Cl.
*H01M 50/30*    (2021.01)
*H01M 4/134*    (2010.01)
(Continued)

(52) U.S. Cl.
CPC .......... *H01M 50/30* (2021.01); *H01M 4/386* (2013.01); *H01M 50/152* (2021.01);
(Continued)

(58) Field of Classification Search
CPC .... H01M 50/54; H01M 4/386; H01M 50/152; H01M 50/167; H01M 50/30;
(Continued)

(56) References Cited

U.S. PATENT DOCUMENTS 5,849,431 A * 12/1998 Kita ..................... H01M 50/325
429/170
6,319,628 B1 * 11/2001 Zama ................... H01M 50/538
429/178
(Continued)

FOREIGN PATENT DOCUMENTS

CN    102683734 A    9/2012
EP    1 596 450 A2    11/2005
(Continued)

OTHER PUBLICATIONS

Machine translation of Description of Han reference (KR20040092531A, cited in IDS) (Year: 2004).*
(Continued)

*Primary Examiner* — Matthew T Martin
*Assistant Examiner* — Jessie Walls-Murray
(74) *Attorney, Agent, or Firm* — Lewis Roca Rothgerber Christie LLP

(57) ABSTRACT

Disclosed is a secondary battery, which has a reinforced strength and can simplify the manufacturing process thereof. For example, one embodiment provides a secondary battery which comprises: an electrode assembly including a first electrode plate and a second electrode plate, wherein one of the first electrode plate and the second electrode plate includes a plurality of first tabs formed to protrude in one
(Continued)

direction; a first current collection tab coupled to the first tabs; a case housing the electrode assembly; and a cap assembly coupled to the upper part of the case, wherein the first current collection tab is coupled to one of the cap assembly and the bottom surface of the case.

15 Claims, 10 Drawing Sheets

(51) Int. Cl.
*H01M 4/38* (2006.01)
*H01M 50/152* (2021.01)
*H01M 50/167* (2021.01)
*H01M 50/50* (2021.01)
*H01M 50/528* (2021.01)
*H01M 50/531* (2021.01)
*H01M 50/533* (2021.01)
*H01M 50/536* (2021.01)
*H01M 50/538* (2021.01)
*H01M 50/574* (2021.01)

(52) U.S. Cl.
CPC ......... *H01M 50/167* (2021.01); *H01M 50/50* (2021.01); *H01M 50/528* (2021.01); *H01M 50/531* (2021.01); *H01M 50/533* (2021.01); *H01M 50/536* (2021.01); *H01M 50/538* (2021.01); *H01M 50/574* (2021.01); *H01M 4/134* (2013.01)

(58) Field of Classification Search
CPC ............. H01M 50/528; H01M 50/533; H01M 50/536; H01M 50/538; H01M 50/572; H01M 4/134; H01M 10/0525; H01M 10/0587; H01M 50/107; H01M 50/184; H01M 50/342; H01M 50/50; H01M 50/531; H01M 50/574; H01M 50/578; H01M 2004/027; H01M 10/0422; H01M 50/55; Y02E 60/10; Y02P 70/50
See application file for complete search history.

(56) References Cited

U.S. PATENT DOCUMENTS

| | | | |
|---|---|---|---|
| 6,653,017 B2 | 11/2003 | Satoh et al. | |
| 7,285,355 B2 * | 10/2007 | Ruth | H01M 50/159 |
| | | | 429/211 |
| 8,236,441 B2 | 8/2012 | Gardner et al. | |
| 9,537,121 B2 | 1/2017 | Kim | |
| 2001/0038945 A1 | 11/2001 | Kitoh et al. | |
| 2001/0051297 A1 * | 12/2001 | Nemoto | H01M 50/572 |
| | | | 429/129 |
| 2002/0004162 A1 | 1/2002 | Satoh et al. | |
| 2007/0269685 A1 | 11/2007 | Chu et al. | |
| 2008/0226981 A1 * | 9/2008 | Yoon | H01M 50/00 |
| | | | 429/174 |
| 2009/0029240 A1 | 1/2009 | Gardner et al. | |
| 2012/0237817 A1 | 9/2012 | Kim | |
| 2013/0130100 A1 * | 5/2013 | Kurata | H01M 50/172 |
| | | | 429/179 |
| 2014/0186692 A1 | 7/2014 | Kim et al. | |
| 2015/0171411 A1 * | 6/2015 | Kobayashi | H01M 50/578 |
| | | | 429/61 |
| 2016/0141589 A1 * | 5/2016 | Kang | H01M 50/46 |
| | | | 429/211 |
| 2017/0141393 A1 | 5/2017 | Lee et al. | |
| 2017/0194619 A1 | 7/2017 | Kim | |
| 2017/0346064 A1 * | 11/2017 | Fukuoka | H01M 50/528 |
| 2017/0365839 A1 * | 12/2017 | Kawate | H01G 11/82 |

FOREIGN PATENT DOCUMENTS

| | | |
|---|---|---|
| JP | 2000-077055 A | 3/2000 |
| JP | 2016-12542 A | 1/2016 |
| KR | 10-2004-0092531 A | 11/2004 |
| KR | 10-2008-0071512 A | 8/2008 |
| KR | 10-2012-0062254 A | 6/2012 |
| KR | 10-1566561 B1 | 11/2015 |
| KR | 10-2016-0129571 A | 11/2016 |
| KR | 2017-0055823 A | 5/2017 |
| KR | 2017-0081449 A | 7/2017 |
| KR | 10-2018-0000223 A | 1/2018 |
| WO | WO 2017/222296 A1 | 12/2017 |

OTHER PUBLICATIONS

"Contact Definition & Meaning", Merriam-Webster, https://www.merriam-webster.com/dictionary/contact—accessed Dec. 13, 2023 and Jan. 19, 2024 (Year: 2023).*
EPO Extended European Search Report dated Oct. 22, 2021, issued in corresponding European Patent Application No. 18899745.6 (9 pages).
Chinese Office action issued in corresponding Application No. 201880089886.8, dated Apr. 1, 2022, 9 pages.
Korean Office action issued in corresponding application KR 10-2018-0002868, dated Feb. 24, 2023, 7 pages.

* cited by examiner

SECONDARY BATTERY AND MANUFACTURING METHOD THEREFOR

CROSS-REFERENCE TO RELATED APPLICATION(S)

This application is a National Phase Patent Application of International Patent Application Number PCT/KR2018/011841, filed on Oct. 8, 2018, which claims priority to Korean Patent Application No. 10-2018-0002868, filed Jan. 9, 2018. The entire contents of all of which are incorporated herein by reference.

TECHNICAL FIELD

The present disclosure relates to a secondary battery which has a reinforced strength and can achieve high power efficiency.

BACKGROUND ART

In a secondary battery, the internal temperature of the battery rises and gases are generated due to an abnormal use or operation, such as a short-circuit or an overcharge, the internal pressure of the battery may rise.

When a lithium secondary battery, for example, is overcharged, an electrolyte is decomposed to generate gases such as carbon dioxide or carbon monoxide, so that the internal pressure of the battery may increase. In addition, when an overcurrent flows due to an overcharge or a short circuit, the internal pressure of the battery may rise to convert the electrolyte into gases. Accordingly, the internal pressure and temperature of the battery may rise and there is a danger of fire, causing a serious safety concern. This may generally deteriorate the performance and life characteristics of the battery.

DESCRIPTION OF EMBODIMENTS

Technical Problem

The present disclosure provides a secondary battery which has a reinforced strength and can achieve high power efficiency.

Solution to Problem

According to an aspect of the present disclosure, provided is a secondary battery which includes: an electrode assembly including a first electrode plate and a second electrode plate, wherein one of the first electrode plate and the second electrode plate includes a plurality of first tabs formed to protrude in one direction; a first current collection tab coupled to the first tabs; a case housing the electrode assembly; and a cap assembly coupled to the upper part of the case, wherein the first current collection tab is coupled to one of the cap assembly and the bottom surface of the case.

Here, the cap assembly may include a safety vent having the first current collection tab connected thereto.

In addition, the first current collection tab may be electrically connected to a sub-plate coupled to a protrusion part of the safety vent.

In addition, the electrode assembly may further include a plurality of second tabs formed to extend from the other of the first electrode plate and the second electrode plate and to protrude in the other direction different from the one direction, and a second current collection tab coupled to the second tabs, wherein the second current collection tab is coupled to the other of the cap assembly and the bottom surface of the case, to which the first current collection tab is not coupled.

Alternatively, the electrode assembly may further include a second tab formed to extend from the other of the first electrode plate and the second electrode plate and to protrude in the other direction different from the one direction, wherein the second tab is coupled to the other of the cap assembly and the bottom surface of the case, to which the first current collection tab is not coupled.

In addition, the first current collecting tab may be positioned at front and rear end of the first tabs to then be coupled to the first tabs by ultrasonic welding.

In addition, the first current collection tab may be coupled to the cap assembly or the case by resistance welding.

In addition, the second electrode plate may be formed of a silicon (Si) based material.

In addition, the first tabs may be arranged in the electrode assembly so as to overlap one another with the same area.

In addition, the first tabs may be configured to have larger areas as they are positioned further outward in view of the winding center of the electrode assembly.

In addition, the first current collection tab may be coupled to the first tabs at front and rear ends of the first tabs and is formed by cutting regions of the first tabs positioned outward in view of end portions of the first tabs.

Advantageous Effects of Disclosure

As described above, the secondary battery according to the present disclosure includes a plurality of first tabs and a plurality of second tabs extending from uncoated portions of a first electrode plate and a second electrode plate constituting an electrode assembly to be integrally formed therewith, thereby increasing electrical efficiency by reducing electrical resistance and preventing deformation of the electrode assembly from occurring when separate lead tabs are coupled to each other, and ultimately avoiding degradation of roundness.

In addition, the secondary battery according to the present disclosure includes current collection tabs including a first current collection tab and a second current collection tab coupled to first tabs and second tabs at front and rear ends thereof, respectively, by which separate lead tabs may be replaced, thereby allowing conventional methods for manufacturing cylindrical batteries to be still utilized, thereby increasing the manufacturing efficiency.

In addition, in the secondary battery according to the present disclosure, when a first current collection tab and a second current collection tab are coupled to first tabs and second tabs, respectively, ultrasonic welding is employed, so that a plurality of protrusions are formed on surfaces of the first and second current collection tabs to increase resistance, thereby allowing the first current collection tab and the second current collection tab to be stably coupled to a sub-plate and a case, respectively, by resistance welding.

In addition, the secondary battery according to the present disclosure includes first tabs and second tabs each formed in the shape of an arc having a corresponding angle on the basis of the center of the electrode assembly to allow the first tabs and the second tabs to make contact with the first current collection tab and the second current collection tab over an increased area to then be coupled to each other, thereby reducing resistance and increasing electrical efficiency.

EXPLANATION OF IMPORTANT REFERENCE NUMERALS IN DRAWINGS

| 100, 200, 300, 400: Secondary battery | 110, 210: Electrode assembly |
|---|---|
| 111a: First tab | 112: Second tab |
| 120: Current collection tab | 121: First current collection tab |
| 122: Second current collection tab | 130: Insulation plate |
| 131: First insulation plate | 132: Second insulation plate |
| 140: Case | 150: Cap-up |
| 160: Safety vent | 162: Sub-plate |
| 170: Insulator | 180: Cap-down |
| 190: Gasket | |

MODE OF DISCLOSURE

Hereinafter, examples of embodiments of the invention will be described in detail with reference to the accompanying drawings such that they can readily be made and used by those skilled in the art.

Figure 1:
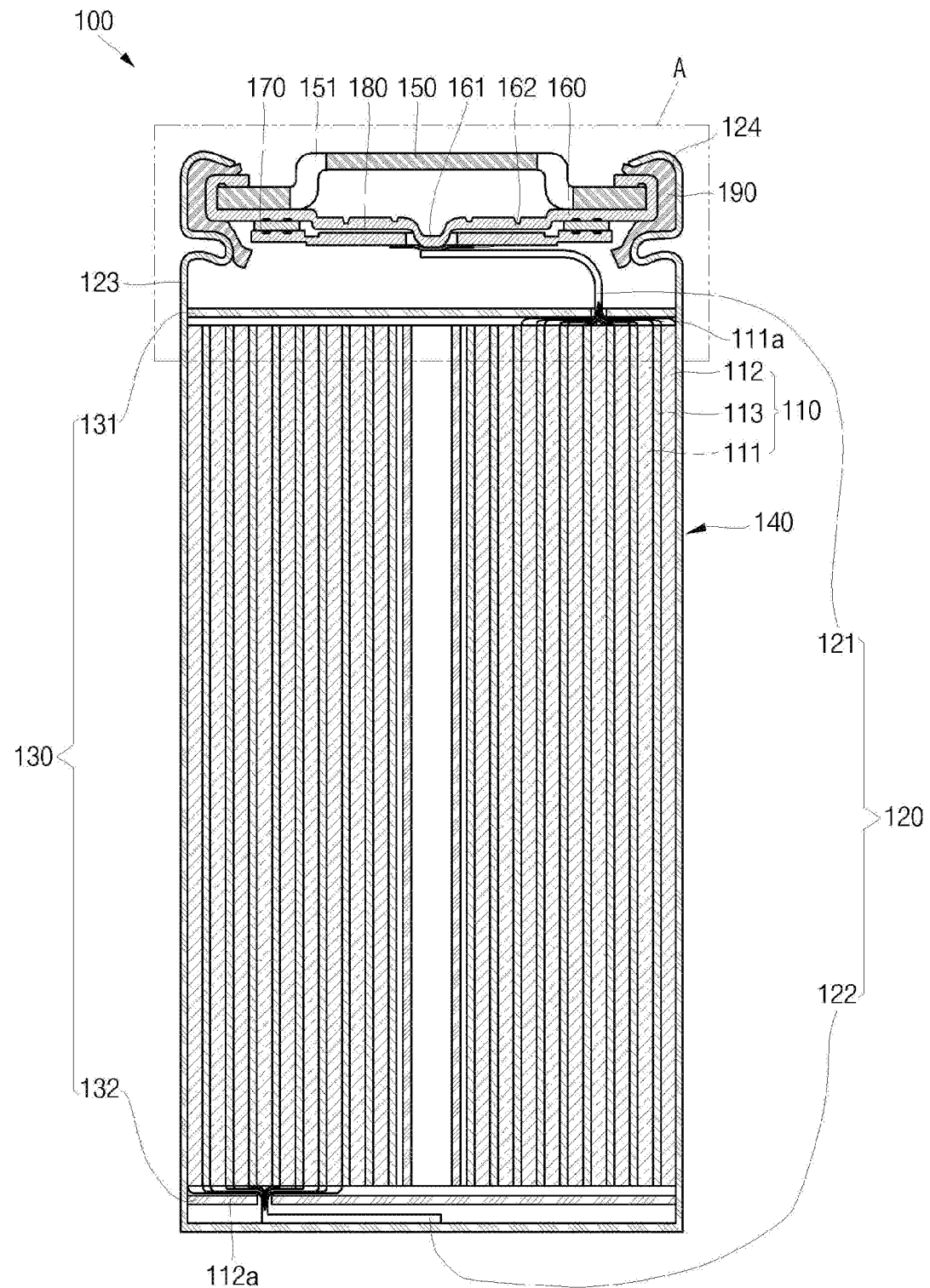
FIG. 1 is a cross-sectional view illustrating a secondary battery according to an embodiment.
Figure 2:
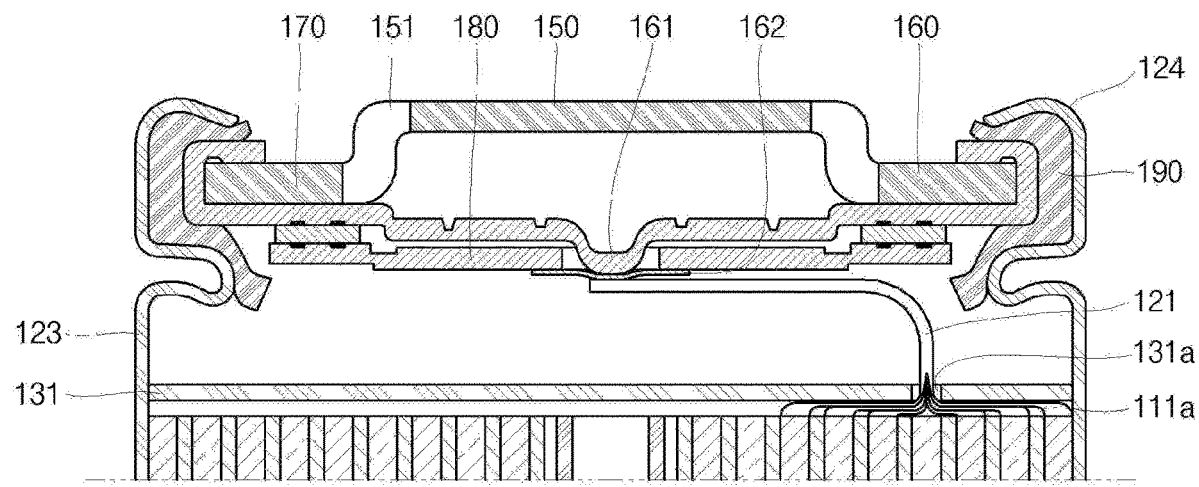
FIG. 2 is an enlarged cross-sectional view illustrating a cap assembly of FIG. 1.

FIG. 1 is a cross-sectional view illustrating a secondary battery according to an embodiment. FIG. 2 is an enlarged cross-sectional view illustrating a cap assembly of FIG. 1.

Referring to FIGS. 1 and 2, the secondary battery 100 according to an embodiment may include an electrode assembly 110, a current collection tab 120 coupled to the electrode assembly 110, an insulation plate 130 coupled to each of upper and lower portions of the electrode assembly 110, a case 140 housing the electrode assembly 110, a cap-up 150 clamped with the case 140, a cap-down 180 located under the cap-up 150 so as to correspond thereto, an insulator 170 located under the cap-down 180, a sub-plate 162 for coupling a lower portion of the cap-down 180 to the current collection tab 120, and a gasket 190 located between the cap-up 150 and the case 140 to make the cap-up 150 closely contact the case 140.

The electrode assembly 110 includes a first electrode plate 111, a second electrode plate 112, and a separator 113 interposed between the first electrode plate 111 and the second electrode plate 112. The electrode assembly 110 may be formed by winding a stacked structure of the first electrode plate 111, the separator 113 and the second electrode plate 112 in a jelly-roll configuration. Here, the first electrode plate 111 may function as a cathode and the second electrode plate 112 may function as an anode.

The first electrode plate 111 is formed by coating a first electrode active material, such as a transition metal oxide, on a first electrode current collector made of a metal foil, such as an aluminum foil. A first current collection tab 121 is attached to the first electrode plate 111. One end of the first current collection tab 121 is electrically connected to the first electrode plate 111, and the other end thereof protrudes to an upper portion of the electrode assembly 110 to then be electrically connected to the cap assembly 130.

Meanwhile, a plurality of first tabs 111a extending to be integrated with the first electrode plate 111 or coupled to the first electrode plate 111 and extending are formed at one side of the first electrode plate 111. The first tabs 111a extend from the first electrode plate 111 and protrude therefrom, and thus the first electrode plate 111 may operate as a first electrode. In addition, the first tabs 111a may be formed through a portion of an uncoated region of the first electrode plate 111, which is not coated with an active material. That is to say, the first tabs 111a are previously formed on various locations of the first electrode plate 111 by pressing, and the first electrode plate 111 is then wound together with the second electrode plate 112 and the separator 113, thereby forming the first tabs 111a to be parallel with one another at given locations. In addition, since the first tabs 111a are integrally formed with the first electrode plate 111, improved electrical performance can be demonstrated, compared to a case where separate lead tabs are attached to the first electrode plate 111.

The second electrode plate 112 is formed by coating a second electrode active material on a second electrode current collector made of a metal foil, such as a copper or nickel foil. In order to increase the capacity, the second electrode plate 112 may use a silicon (Si) based material as the second electrode active material. In this case, since the silicon used as the active material of the second electrode plate 112 is highly expandable, an increased amount of the silicon may advantageously increase the capacity per unit volume. However, as the amount of the silicon is increased, deformation of the second electrode plate 112 may also be increased. In particular, in a case where separate lead tabs are attached to the second electrode plate 112, the second electrode plate 112 formed in the wound electrode assembly 110 may be distorted due to the thicknesses of the lead tabs, resulting in deformation of the electrode assembly 110 and degrading the roundness.

In the secondary battery 100 according to an embodiment, like the first electrode plate 111, the second electrode plate 112 may also include second tabs 112a extending from the second electrode plate 112, and the second tabs 112a are configured to extend from and integrally formed with the second electrode plate 112, and thus deformation may not be caused to the electrode assembly 110. In addition, since the second tabs 111a are integrally formed with the second electrode plate 112, improved electrical performance can be demonstrated, compared to a case where separate lead tabs are attached to the second electrode plate 112.

However, in the secondary battery 100 according to an embodiment, either of the first tabs 111a and the second tabs 112a may be replaced with a single lead tab.

The separator 113 is disposed between the first electrode plate 111 and the second electrode plate 112 to prevent a short circuit therebetween while allowing lithium ions to move. The separator 113 may be made of polyethylene, polypropylene or a composite film of polyethylene and polypropylene.

In addition, as will later be described, in a state in which one end of the first current collection tab 121 is coupled to the first tabs 111a, the other end opposite to the one end of the first current collection tab 121 may be adjustably cut into a desired length and the first current collection tab 121 may then be coupled to the sub-plate 162.

Meanwhile, the second current collection tab 122 is coupled to the second tabs 112a at front and rear ends thereof by ultrasonic welding. Accordingly, the second tabs 112a are put together and then fixed at one end of the second current collection tab 122. In addition, the other end of the second current collection tab 122 may be coupled to the bottom surface of the case 140. Therefore, the second current collection tab 122 may electrically connect the second electrode plate 112 and the second tabs 112a to the case 140. Here, since the case 140 is electrically disconnected from the cap-up 150 by the gasket 190, an electrical short circuit does not occur. Like the first current collection tab 121, in a state in which one end of the second current collection tab 122 is coupled to the second tabs 112a, the other end opposite to the one end of the second current collection tab 122 may be adjustably cut into a desired length and the second current collection tab 122 may then be coupled to the case 140.

The current collection tab 120 may include a pair of current collection tabs 120, which are coupled to the first tabs 111a and the second tabs 112a of the electrode assembly 110, respectively. The pair of current collection tabs 120 may be coupled to the plurality of first tabs 111a and the plurality of second tabs 112a at front and rear ends thereof, respectively, to then be fixed by ultrasonic welding. The current collection tab 120 may include the first current collection tab 121 coupled to the first tabs 111a and the second current collection tab 122 coupled to the second tabs 112a.

The first current collection tab 121 electrically connect the first tabs 111a and the safety vent 160. The first current collection tab 121 is coupled to the first tabs 111a at front and rear ends thereof by ultrasonic welding, and thus can put together the plurality of first tabs 111a to then be fixed.

In addition, the first current collection tab 121 may be coupled to the sub-plate 162 bent from the location of the first tabs 111a to be coupled to a lower portion of the safety vent 160. Therefore, the first electrode plate 111 may be electrically connected to the safety vent 160 by means of the first tabs 111a, the first current collection tab 121 and the sub-plate 162, and thus may be finally connected to the cap-up 150. However, when the safety vent 160 is upwardly inverted due to the internal pressure of the case 140, the sub-plate 162 is separated from the safety vent 160, so that the safety vent 160 and the cap-up 150 are electrically disconnected from the first electrode plate 111, thereby promoting safety.

Meanwhile, as a result of ultrasonic welding employed in fixing the first current collection tab 121 and the second current collection tab 122, a plurality of protrusions may be formed on surfaces of the first current collection tab 121 and the second current collection tab 122. Therefore, during resistance welding employed in coupling the first current collection tab 121 to the sub-plate 162 and in coupling the second current collection tab 122 to the bottom surface of the case 140, the resistance may be increased by the protrusions, thereby allowing the resistance welding to be performed in a more easy and secured manner. Therefore, the states in which the first current collection tab 121 and the second current collection tab 122 are coupled to the sub-plate 162 and the case 140 can be more securely maintained.

However, when either of the first tabs 111a and the second tabs 112a has a lead tab structure, a current collection tab corresponding thereto may not be separately provided. In this case, the lead tab may be directly coupled to the safety vent 160 or the bottom surface of the case 140.

The insulation plate 130 is formed at upper and lower portions of the electrode assembly 110. The insulation plate 130 may be formed as a substantially circular plate. The insulation plate 130 may be made of an electrically insulating material, which typically includes polypropylene (PP) or polyethylene (PE), but embodiments of the present disclosure are not limited thereto.

The insulation plate 130 may include a first insulation plate 131 positioned between the electrode assembly 110 and the cap-down 180, and a second insulation plate 132 positioned between the electrode assembly 110 and the bottom surface of the case 140.

The first insulation plate 131 may be formed to cover an upper region of the electrode assembly 110 and may include a hole 131a provided to correspond to a region from which the first tabs 112a protrude. Accordingly, the first tabs 112a may further protrude to an upper portion of the first insulation plate 131 to then be coupled to the first current collection tab 121.

In addition, the second insulation plate 132 may be shaped to correspond to the first insulation plate 131. Therefore, the second insulation plate 132 may be formed to cover a lower region of the electrode assembly 110 and may include a hole (not shown) through which the second tabs 112a protrude to a lower portion of the second insulation plate 132. Accordingly, the second tabs 112a may be coupled to the second current collection tab 122.

The case 140 includes a side surface plate 141 shaped of a cylindrical body having a predetermined diameter to provide a space in which the electrode assembly 110 is received, and a bottom surface plate 142 for sealing a bottom portion of the side surface plate 141. A top opening of the case 140 is opened so as to be sealed after the electrode assembly 110 is inserted into the case 140. In addition, a beading part 143 for preventing movement of the electrode assembly 110 is provided at an upper portion of the case 140. In addition, a crimping part 144 for fixing the cap assembly 130 and the gasket 190 is provided at the topmost end of the case 140.

The cap-up 150, the safety vent 160, the insulator 170 and the cap-down 180 may constitute the cap assembly 130. In addition, the cap assembly 130 may further include the sub-plate 162 fixed on a bottom surface of the safety vent 160 downwardly protruding through a through-hole of the cap-down 180 and electrically connected to the first current collection tab 121.

The cap-up 150 having an upper portion upwardly protruding may be electrically connected to an external circuit. The cap-up 150 includes gas discharge holes 151 formed to provide pathways through which gases generated in the case 140 are discharged. The cap-up 150 is electrically connected to the electrode assembly 110 and transfers the current generated in the electrode assembly 110 to the external circuit.

The safety vent 160 is formed to have a circular plate so as to be shaped to correspond to the cap-up 150 and includes a downwardly protruding protrusion part 161 provided at its center. The safety vent 160 is electrically connected to the sub-plate 162 positioned on the bottom surface of the cap-down 180 using the protrusion part 161 penetrating the through-hole 181 of the cap-down 180. Here, the protrusion part 161 of the safety vent 160 and the sub-plate 162 may be welded to each other by laser welding, ultrasonic welding, resistance welding, or the like.

The safety vent 160 is installed to make close contact with other parts of the cap-up 150, except for the upwardly protruding part, and discharges internal gases while interrupting the current when an internal pressure is abnormally generated within the case 140. If the internal pressure the case 140 exceeds an operating pressure of the safety vent 160, the protrusion part 161 of the safety vent 160 rises to then be electrically disconnected from the sub-plate 162.

Here, a portion of the sub-plate 162, which is welded to the protrusion part 161, is ruptured, and the sub-plate 162 is electrically disconnected from the safety vent 160. In addition, when the internal pressure of the case 140 exceeds a rupture pressure higher than the operating pressure of the safety vent 160, the safety vent 160 is ruptured. Accordingly, the internal gas may be discharged through the gas discharge holes 151 of the cap-up 150.

To this end, the sub-plate 162 is positioned under the cap-down 180. The sub-plate 162 is welded between the protrusion part 161 of the safety vent 160, which penetrates the through-hole 181 of the cap-down 180, and the first current collection tab 121. Accordingly, the sub-plate 162 electrically connects the first current collection tab 121 and the protrusion part 161 to each other. Meanwhile, if the internal pressure of the case 140 increases, the protrusion part 161 of the safety vent 160 may rise, and the sub-plate 162 may be electrically disconnected from the protrusion part 161. Therefore, the safety vent 160 may also be electrically disconnected from the first current collection tab 121.

The insulator 170 is disposed between the safety vent 160 and the cap-down 180 to insulate the safety vent 160 and the cap-down 180 from each other. The insulator 170 may be made of a resin material such as polyethylene (PE), polypropylene (PP), or polyethylene terephthalate (PET).

The cap-down 180 is shaped of a circular plate. The cap-down 180 includes the through-hole 181 of the cap-down 180 formed at its center, and the protrusion part 161 of the safety vent 160 may penetrate the through-hole 181. In addition, the insulator 170 is formed on the top surface of the cap-down 180 to electrically disconnect the safety vent 160 and the cap-down 180 from each other.

The gasket 190 is installed at the top opening of the case 140. That is to say, the gasket 190 is assembled to make close contact with outer peripheral edges of the cap-up 150 and the safety vent 160 and the top opening of the case 140. The gasket 190 may prevent the cap assembly 130 from being separated from the case 140.

As described above, the secondary battery 100 according to an embodiment includes the plurality of first tabs 111a and the plurality of second tabs 112a extending from the respective uncoated portions of the first electrode plate 111 and the second electrode plate 112, which constitute the electrode assembly 110, to be integrally formed with the first electrode plate 111 and the second electrode plate 112, thereby increasing electrical efficiency by reducing electrical resistance, and preventing deformation of the electrode assembly from occurring in a case where separate lead tabs are coupled to the first and second electrode plates 111 and 112, and ultimately preventing lowering of roundness.

In addition, the secondary battery 100 according to an embodiment includes the current collection tab 120, which consists of the first current collection tab 121 and the second current collection tab 122 coupled to the first tabs 111a and the second tabs 112a at front and rear ends thereof, by which separate lead tabs are replaced, thereby allowing conventional methods for manufacturing cylindrical batteries to be still utilized, thereby increasing the manufacturing efficiency.

In addition, when the first current collection tab 121 and the second current collection tab 122 are coupled to the first tabs 111a and the second tabs 112a, respectively, ultrasonic welding is employed, so that a plurality of protrusions are formed on surfaces of the first current collection tab 121 and the second current collection tab 122 to increase resistance, thereby allowing the first current collection tab 121 and the second current collection tab 122 to be stably coupled to the sub-plate 162 and the case 14, respectively, by resistance welding.

Hereinafter, a manufacturing method of a secondary battery according to an embodiment will be described in greater detail.

Figure 3:
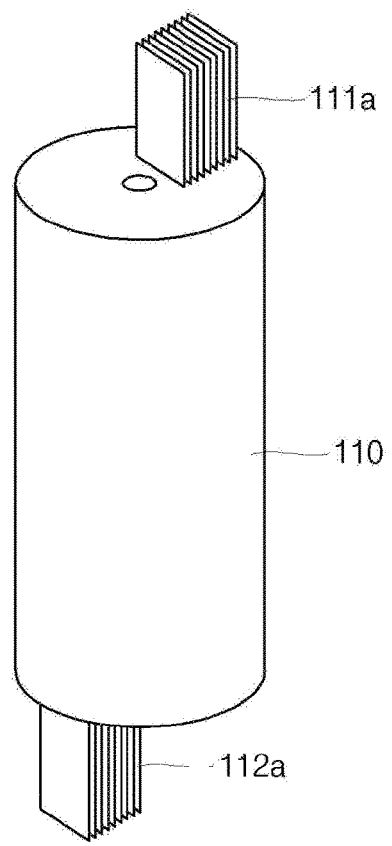
FIG. 3 is a perspective view illustrating an electrode assembly in the secondary battery according to an embodiment.
Figure 4:
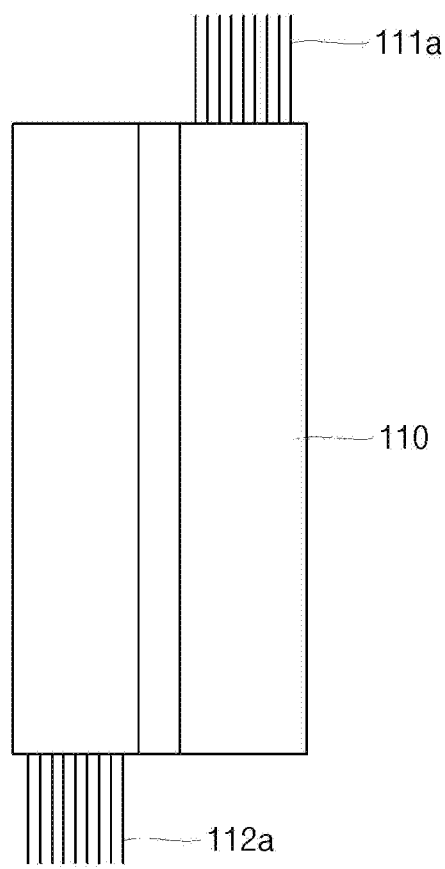
FIG. 4 is a side view illustrating the electrode assembly in the secondary battery according to an embodiment.
Figure 5:
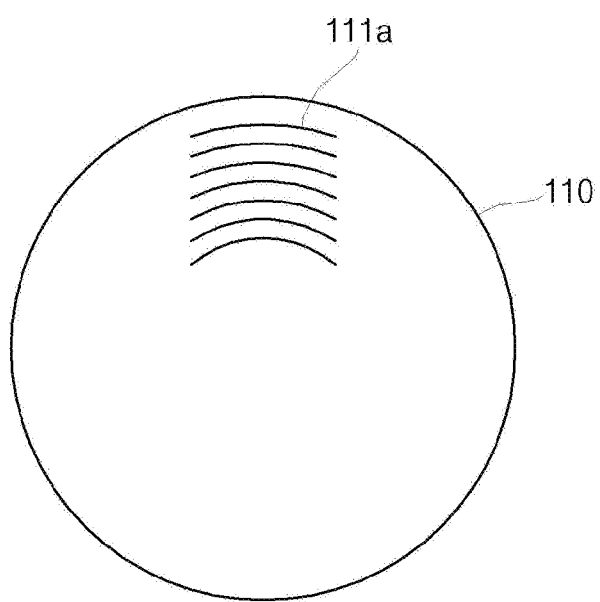
FIG. 5 is a plan view illustrating the electrode assembly in the secondary battery according to an embodiment.
Figure 6:
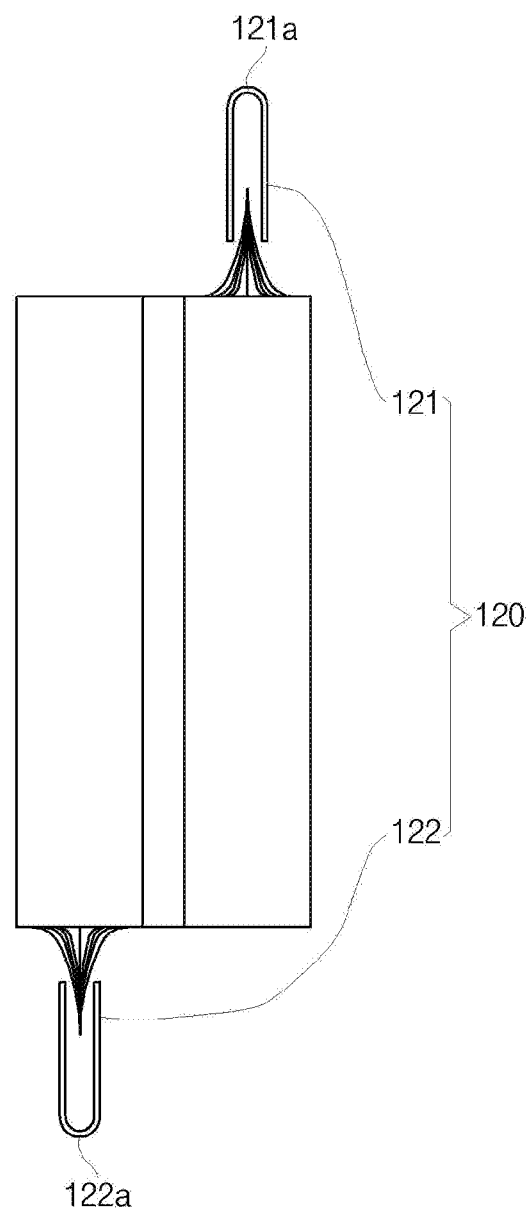
FIG. 6 is a side view illustrating a state in which a current collection tab is coupled to the electrode assembly in the secondary battery according to an embodiment.
Figure 7:
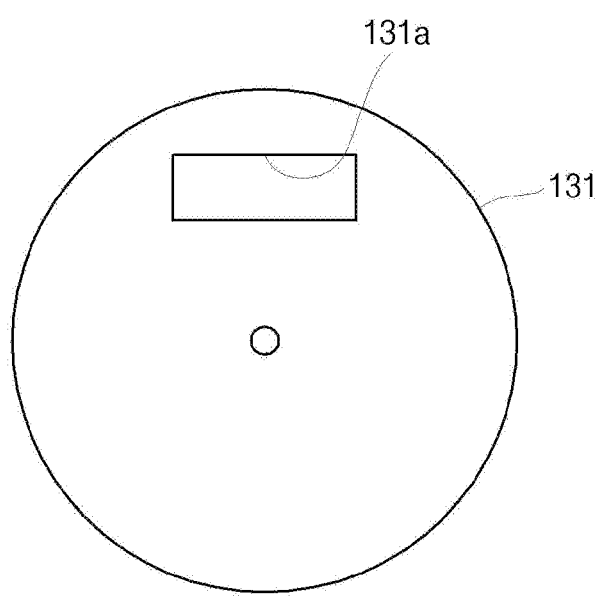
FIG. 7 is a plan view illustrating an insulation plate in the secondary battery according to an embodiment.
Figure 8:
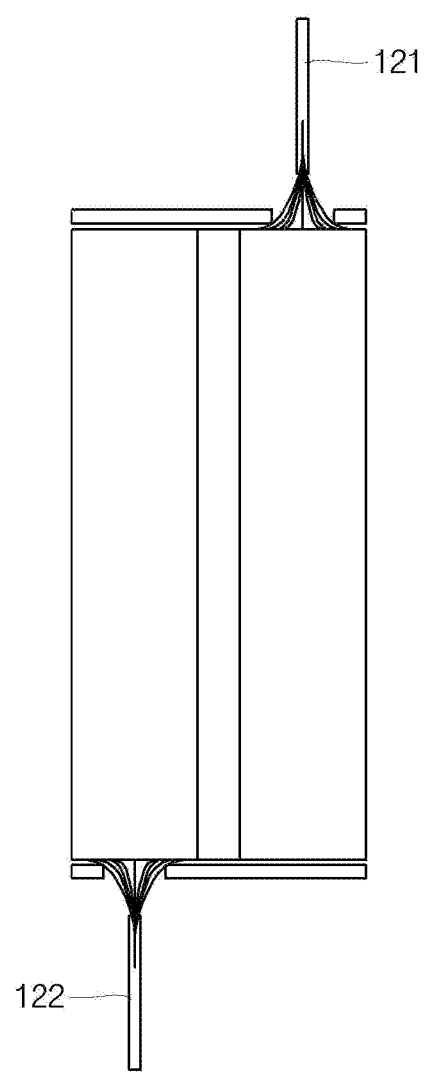
FIG. 8 is a side view illustrating the insulation plate provided at the electrode assembly in the secondary battery according to an embodiment.
Figure 9:
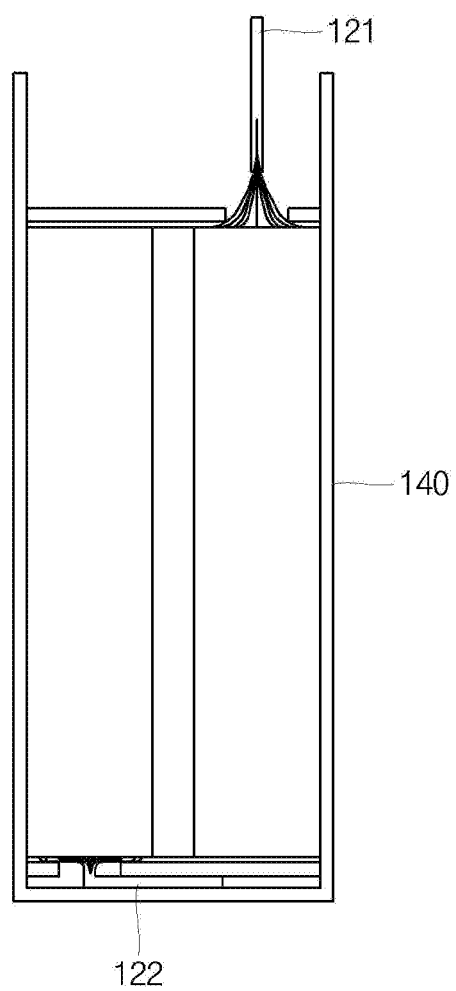
FIG. 9 is a cross-sectional view illustrating a state in which the electrode assembly is inserted into a case in the secondary battery according to an embodiment.

FIG. 3 is a perspective view illustrating an electrode assembly in the secondary battery according to an embodiment. FIG. 4 is a side view illustrating the electrode assembly in the secondary battery according to an embodiment. FIG. 5 is a plan view illustrating the electrode assembly in the secondary battery according to an embodiment. FIG. 6 is a side view illustrating a state in which a current collection tab is coupled to the electrode assembly in the secondary battery according to an embodiment. FIG. 7 is a plan view illustrating an insulation plate in the secondary battery according to an embodiment. FIG. 8 is a side view illustrating the insulation plate provided at the electrode assembly in the secondary battery according to an embodiment. FIG. 9 is a cross-sectional view illustrating a state in which the electrode assembly is inserted into a case in the secondary battery according to an embodiment.

First, referring to FIGS. 3 and 4, an electrode assembly 110 having a generally cylindrical shape and including first tabs 111a extending from and integrally formed with a first electrode plate and second tabs 112a extending from and integrally formed with a second electrode plate, is provided.

Here, the first tabs 111a may protrude to an upper portion of the electrode assembly 110, and the second tabs 112a may protrude to a lower portion of the electrode assembly 110.

Referring to FIG. 5, the first tabs 111a may be arranged so as to have an equal width. Therefore, when the first tabs 111a are compressed at front and rear ends to overlap each other with the same area, thereby facilitating welding.

Next, referring to FIG. 6, a first current collection tab 121 and a second current collection tab 122 are coupled to the first tabs 111a and the second tabs 112a, respectively. Here, the first current collection tab 121 and the second current collection tab 122 may be formed in a substantially U shape or a clip shape, and may be spaced apart from each other in view of connecting parts 121a and 122a provided at centers thereof, to receive the first tabs 111a and the second tabs 112a to then be coupled to each other by ultrasonic welding. In addition, after the first current collection tab 121 and the second current collection tab 122 are welded to each other, the connecting parts 121a and 122a may be removed by cutting. Accordingly, the first current collection tab 121 and the second current collection tab 122 may be adjustably cut into a desired length as much as lengths of the connecting parts 121a and 122a, and even in this case, the first current collection tab 121 and the second current collection tab 122 may be maintained at a coupled state because they are welded to the first tabs 111a and the second tabs 112a.

Referring to FIGS. 7 and 8, a first insulation plate 131 and a second insulation plate 132 may be coupled to top and bottom portions of the electrode assembly 110, respectively. The respective insulation plates 131 and 132 include holes 131a and 132a to allow the first tabs 111a and the second tabs 112a of the electrode assembly 110 to protrude therethrough, thereby maintaining the tabs 111a and 112a to be coupled to the respective current collection tabs 121 and 122.

In addition, referring to FIG. 9, the electrode assembly 110, the current collection tab 120 and the insulation plate 130 may be housed together within the case 140. In addition, as described above, the second current collection tab 122 may be coupled to the bottom surface of the case 140 by resistance welding. Meanwhile, although not separately shown, a cap assembly may later be coupled to the top portion of the case 140, and the first current collection tab 121 may be coupled to a sub-plate 162 of the cap assembly by resistance welding. Thereafter, sidewalls of the case 140 may be clamped with the cap assembly, thereby completing a final structure.

Hereinafter, a configuration of a secondary battery according to another embodiment will be described.

Figure 10:
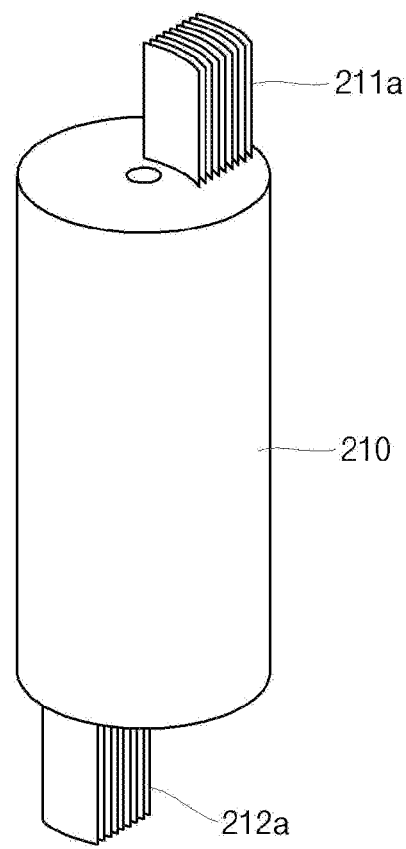
FIG. 10 is a perspective view illustrating an electrode assembly in a secondary battery according to another embodiment.
Figure 11:
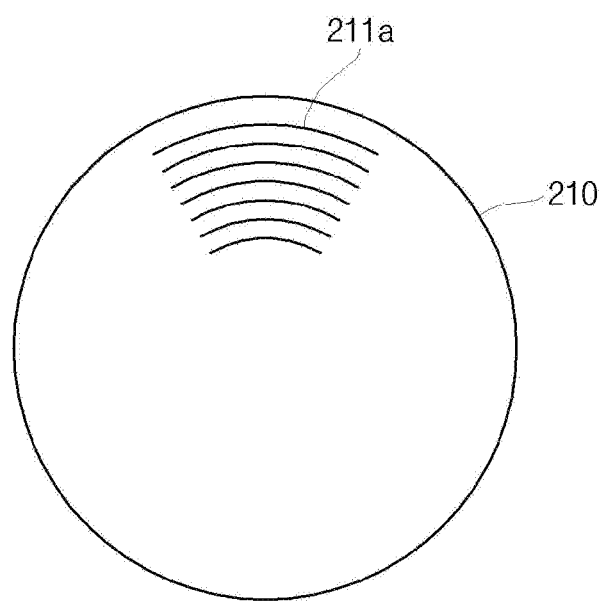
FIG. 11 is a plan view illustrating the electrode assembly in the secondary battery according to another embodiment.

FIG. 10 is a perspective view illustrating an electrode assembly in a secondary battery according to another embodiment. FIG. 11 is a plan view illustrating the electrode assembly in the secondary battery according to another embodiment.

Referring together to FIGS. 10 and 11, the secondary battery according to another embodiment may include an electrode assembly 210. Here, although not shown, other elements, except for the electrode assembly 210, may be configured in the same manner as in the previous embodiment, and the following description will focus on the configuration of the electrode assembly 210.

The electrode assembly 210 may include first tabs 211a and second tabs 212a protruding to top and bottom portions thereof, respectively. Here, the first tabs 211a and the second tabs 212a may be configured to extending from uncoated portions of a first electrode plate and a second electrode plate to be integrally formed therewith, respectively. In addition, the first tabs 211a and the second tabs 212a may be configured to have larger areas as they are positioned further from the center of the electrode assembly 110. That is to say, each of the first tabs 211a and the second tabs 212a may be provided in the shape of an arc having a corresponding angle on the basis of the center of the electrode assembly 110. With this configuration, the first tabs 211a and the second tabs 212a may make contact with the first current collection tab and the second current collection tab over an increased area to then be coupled to each other, thereby reducing resistance and ultimately increasing electrical efficiency.

Although the foregoing embodiments have been described to practice the secondary battery of the present disclosure and the manufacturing method thereof, these embodiments are set forth for illustrative purposes and do not serve to limit the present disclosure. Those skilled in the art will readily appreciate that many modifications and variations can be made, without departing from the spirit and scope of the disclosure as defined in the appended claims, and such modifications and variations are encompassed within the scope and spirit of the present disclosure.

INDUSTRIAL APPLICABILITY

The present disclosure relates to a secondary battery which has a reinforced strength and can achieve high power efficiency.

The invention claimed is:

1. A secondary battery which comprises:
an electrode assembly including a first electrode plate and a second electrode plate, wherein one of the first electrode plate and the second electrode plate includes a plurality of first tabs integrally formed with the one of the first electrode plate and second electrode plate and formed to protrude in one direction;
a first current collection tab coupled to the first tabs;
a case housing the electrode assembly;
a cap assembly coupled to an upper part of the case; and
an insulation plate between the electrode assembly and the cap assembly, the insulation plate having an opening,
wherein the first current collection tab and the first tabs both penetrate through, and are coupled together at a position corresponding to, the opening of the insulation plate and are coupled to one of the cap assembly and a bottom surface of the case, the first current collection tab being in contact with a first side and a second side of the first tabs, and the first tabs being in direct physical contact with one another within the first current collection tab.

2. The secondary battery of claim 1, wherein the cap assembly comprises a safety vent having the first current collection tab connected thereto.

3. The secondary battery of claim 2, wherein the first current collection tab is electrically connected to a sub-plate, the sub-plate being coupled to a protrusion part of the safety vent.

4. The secondary battery of claim 1, wherein the electrode assembly further includes a plurality of second tabs formed to extend from an other one of the first electrode plate and the second electrode plate and to protrude in an other direction different from the one direction, and a second current collection tab coupled to the second tabs, and
wherein the second current collection tab is coupled to an other one of the cap assembly and the bottom surface of the case, to which the first current collection tab is not coupled.

5. The secondary battery of claim 4, wherein a plurality of protrusions are formed on a surface of the second current collection tab.

6. The secondary battery of claim 1, wherein the electrode assembly further includes a second tab formed to extend from an other one of the first electrode plate and the second electrode plate and to protrude in an other direction different from the one direction, and
wherein the second tab is coupled to an other one of the cap assembly and the bottom surface of the case, to which the first current collection tab is not coupled.

7. The secondary battery of claim 6, wherein the second electrode plate comprises a second electrode current collector and a second electrode active material on the second electrode current collector,
wherein the second electrode plate comprises an uncoated region that is not coated with the second electrode active material, and wherein the second tab is formed through a portion of the uncoated region.

8. The secondary battery of claim 1, wherein the first current collection tab is positioned at front and rear ends of the first tabs and coupled to the first tabs by ultrasonic welding.

9. The secondary battery of claim 1, wherein the first current collection tab is coupled to the cap assembly or the case by resistance welding.

10. The secondary battery of claim 1, wherein the second electrode plate is formed of a silicon (Si) based material.

11. The secondary battery of claim 1, wherein the first tabs are arranged in the electrode assembly so as to overlap one another with the same area.

12. The secondary battery of claim 1, wherein the first tabs are configured to have larger areas when positioned further outward in view of a winding center of the electrode assembly.

13. The secondary battery of claim 1, wherein the first electrode plate comprises a first electrode current collector and a first electrode active material on the first electrode current collector,
wherein the first electrode plate comprises an uncoated region that is not coated with the first electrode active material, and
wherein a first tab of the plurality of first tabs is formed through a portion of the uncoated region.

14. The secondary battery of claim 1, wherein a plurality of protrusions are formed on a surface of the first current collection tab.

15. A secondary battery which comprises:
an electrode assembly including a first electrode plate and a second electrode plate, wherein one of the first electrode plate and the second electrode plate includes a plurality of first tabs integrally formed with the one of the first electrode plate and second electrode plate and formed to protrude in one direction, and the plurality of first tabs are aligned in another direction perpendicular to the one direction;
a first current collection tab coupled to the first tabs;
a case housing the electrode assembly;
a cap assembly coupled to an upper part of the case; and
an insulation plate between the electrode assembly and the cap assembly, the insulation plate having an opening,
wherein the first current collection tab and the first tabs both penetrate through, and are coupled together at a position corresponding to, the opening of the insulation plate and are coupled to one of the cap assembly and a bottom surface of the case, the first tabs being in direct physical contact with one another within the first current collection tab.

* * * * *